United States Patent [19]
Yang

[11] Patent Number: 5,465,857
[45] Date of Patent: Nov. 14, 1995

[54] VACUUM CAP FOR LIQUOR BOTTLES

[76] Inventor: Heng-Te Yang, 20-1, Hsin Ho Heng Rd., Tainan, Taiwan

[21] Appl. No.: 125,748

[22] Filed: Sep. 24, 1993

[51] Int. Cl.[6] .................................................. B65D 51/16
[52] U.S. Cl. ........................ 215/228; 215/260; 215/262; 215/270; 215/311; 220/231; 137/522; 137/854; 206/524.8; 417/437; 99/472; 141/65
[58] Field of Search ...................... 215/228, 260, 215/262, 270, 307, 311; 220/203, 209, 212, 231, 240, 361, 367, 203.11, 203.13, 367.1; 137/522, 854; 206/524.8; 417/437; 99/472; 141/65, 66

[56] References Cited

U.S. PATENT DOCUMENTS

| | | | |
|---|---|---|---|
| 4,535,820 | 8/1985 | Raines | 137/854 |
| 4,763,803 | 8/1988 | Schneider | 215/260 |
| 4,838,324 | 6/1989 | Boyd | 215/260 X |
| 5,031,785 | 7/1991 | Lemme | 215/228 |

*Primary Examiner*—Stephen P. Garbe
*Assistant Examiner*—Stephen Cronin

[57] ABSTRACT

A vacuum cap for liquor bottles comprising a lower cap body combined on a cylindrical body fixed around a top end of a bottle, an air valve disposed in an annular upper recess of the lower cap body and blocking air holes in the recess and having two upwardly and outwardly extending projections protruding through two slots in an upper cap body fitted in the recess and located over the air valve, an independent air pump being placed on the lower cap body for pumping out the air in the bottle through the air holes and a gap between the air valve and the recess and through the two slots in the upper cap body so as to establish a vacuum in the bottle for preserving liquor contained in the bottle.

2 Claims, 5 Drawing Sheets

VACUUM CAP FOR LIQUOR BOTTLES

BACKGROUND OF THE INVENTION

The most common way for preserving liquor is shown in FIG. 1, wherein a soft stopper 11 is inserted in a top opening 10 of a bottle, if the liquor is not yet wholly consumed. This kind of preserving may let some air remain in the bottle after it is closed by the stopper. The remaining air may cause the liquor in the bottle to change chemically and lose its original taste.

SUMMARY OF THE INVENTION

This invention has ben devised to offer a kind of cap for liquor bottles with the following features. 1. The air remaining in a bottle can be pumped out through this cap, thus preserving the liquor therein in a vacuum condition for a long period of time. 2. It can be capped on a bottle or uncapped easily. 3. Two upwardly and outwardly extending projections of an air valve are prevented by an upper cap body from breaking or the whole air valve is prevented from being pulled out when either of the projections is pulled to make a gap between the air valve and a lower cap body.

A vacuum cap for liquor bottles in the present invention has a cylindrical body to be fixed around an upper end of a bottle, a T-shaped tight gasket fixed in a top opening of the cylindrical body, and a lower cap body combined on the cylindrical body and the gasket and having an upper central recess with a central hole for receiving an air valve. The air valve has two upwardly and outwardly extending projections which protrude through two slots in an upper cap body to permit manually moving either of the two projections to form a gap between the air valve and the recess of the lower cap body so that open air can flow through the two slots of the upper cap body, and through air holes in the recess of the lower cap body from the interior of a bottle. In pumping out the air from the bottle, an independent air pump is placed on the recess of the lower cap body and a cylinder is pulled up and pushed down repeatedly in a stationary cylinder of the air pump until the air in the bottle is completely drawn out through the air holes in the recess of the lower cap body, through the gap between the air valve and the recess, and finally through the two slots in the upper cap body.

DETAILED DESCRIPTION OF THE INVENTION

Figure 1:
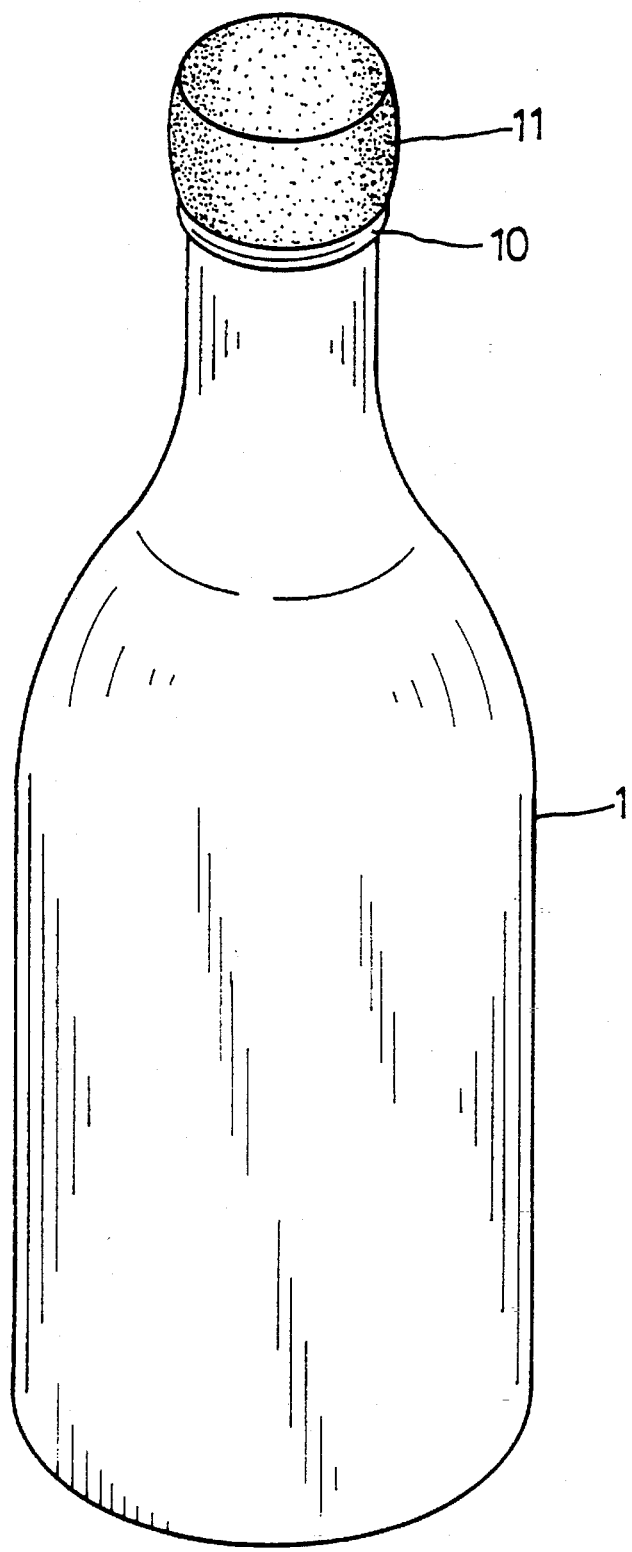
FIG. 1 is a perspective view of a conventional cap for liquor bottles.
Figure 2:
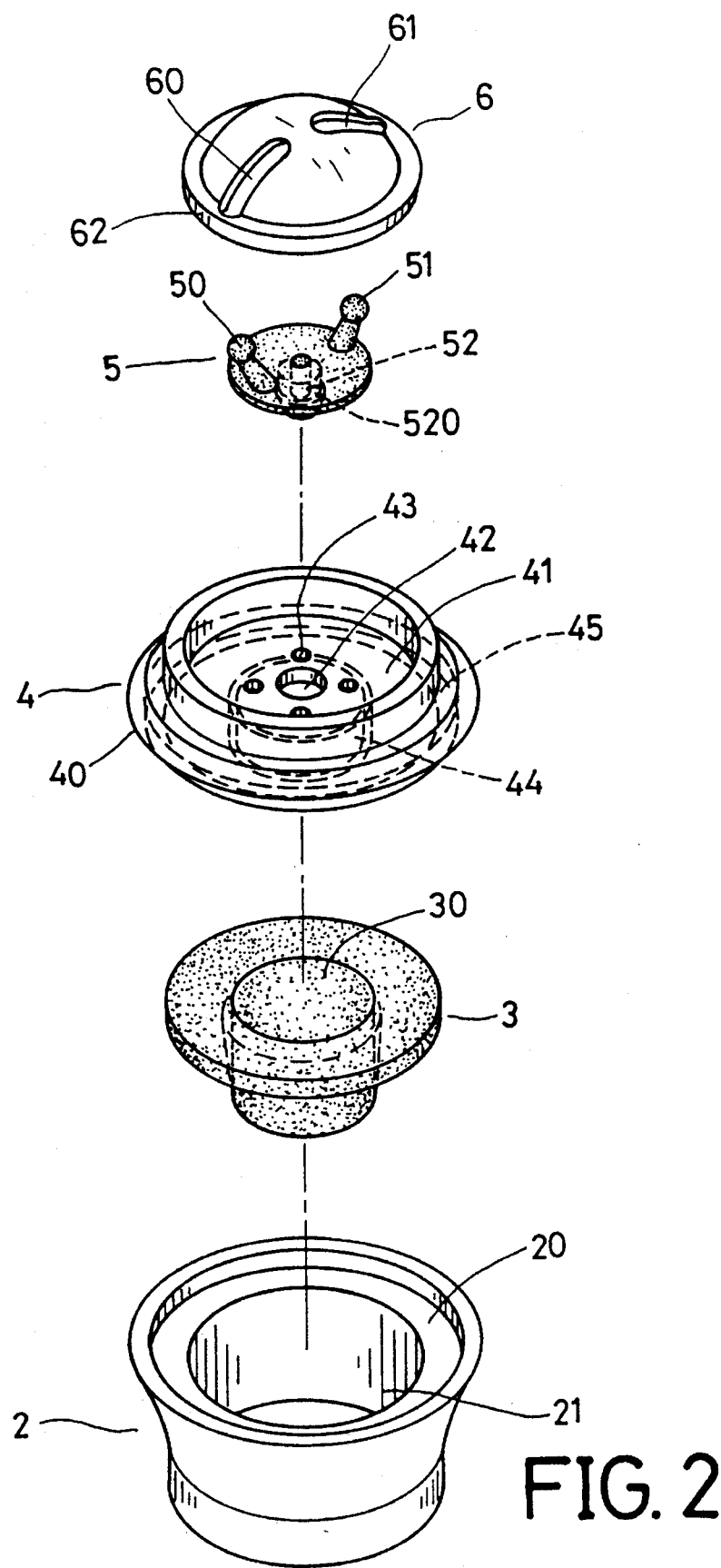
FIG. 2 is an exploded perspective view of a vacuum cap for liquor bottles in the present invention.

A vacuum cap for liquor bottles in the present invention, as shown in FIG. 2, comprises a cylindrical body 2, a tight gasket 3. A lower cap body 4, an air valve 5 and an upper cap body 6 combined together.

The cylindrical body 2 has a wider upper portion which gradually converges downwardly, an annular recess 20 in the upper portion and an inner diverging annular wall 21.

The tight gasket 3 is made of a resilient material like rubber, has a T-shaped configuration, fits in the annular recess 20 of the cylindrical body 2, and has a central hole 30 extending axially downwardly.

The lower cap body 4 is shaped as a disc, sits on the upper edge of the cylindrical body 2, has a curved circumferential edge 40, a central upper recess 41, a central hole 42 in the recess 41, a plurality of air holes 43 spaced equally around the central hole 42, an annular wall 44 extending downwardly, and an annular outer edge 45 surrounding the outer surface of the annular wall 44.

The air valve 5 is of round shape and placed in the recess 41 of the lower cap body 4, has two upwardly and outwardly extending projections 50, 51, a downwardly extending projection 52 and an annular stop groove 520 around the projection 52.

The upper cap body 6 has a dome-shaped upper surface, two opposite slots 60, 61 for receiving the two projections 50, 51 of the air valve 5 to protrude therefrom, and a downwardly extending outer circumferential edge 62 to fit around the circumferential wall defining the recess 41.

Figure 3:
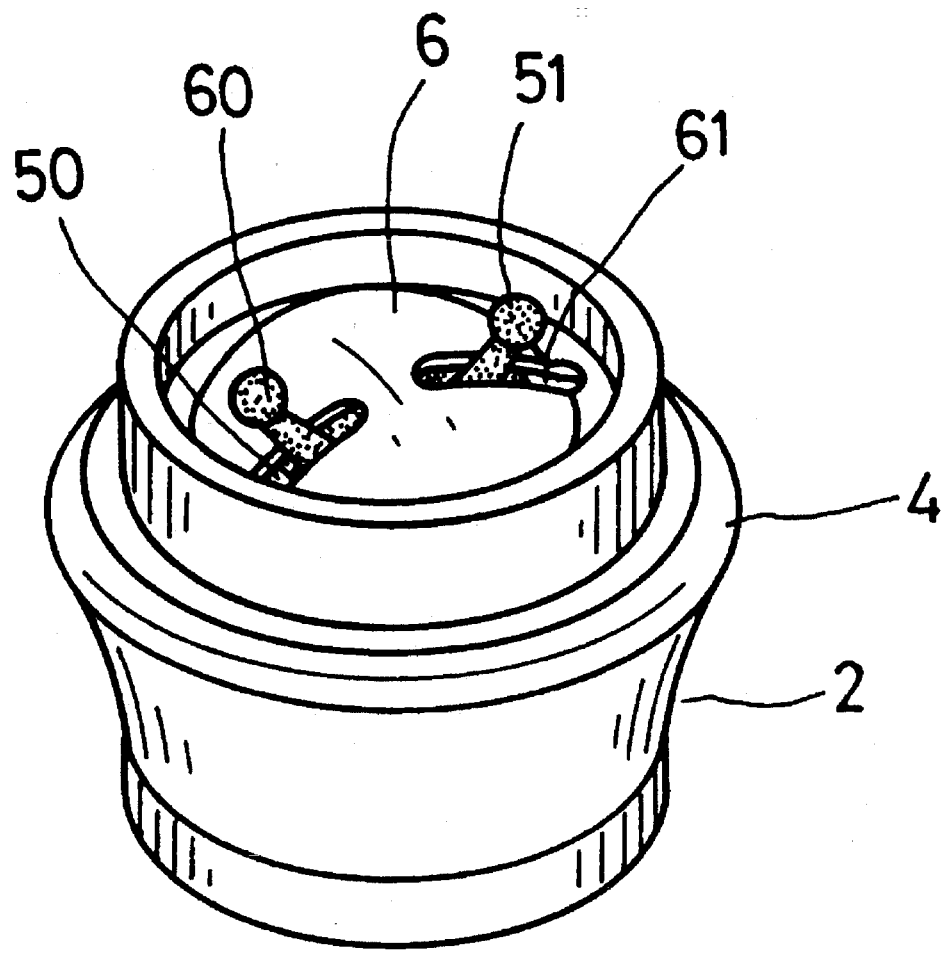
FIG. 3 is a perspective view of the vacuum cap for liquor bottles in the present invention.

In assembling the cap, as shown in FIGS. 2 and 3, the tight gasket 3 is first pushed in the lower cap body 4, with the hole 30 receiving the annular wall 44. Then the lower cap body 4 is combined tightly with the cylindrical body 2, with the annular outer edge 45 fitting in the recess 20. Next, the air valve 5 is combined with the lower cap body 4, with the down projection 52 passing through the central hole 42 and the annular stop groove 520 engaging the periphery of the central hole 42, thus blocking the air holes 43. After that, the upper cap body 6 is pushed in the recess 41, with the two slots 60, 61 being protruded by the two projections 50, 51, and fused together with the bottom of the recess 41 by means of a high frequency welding process, thus finishing the assemblage.

Figure 4:
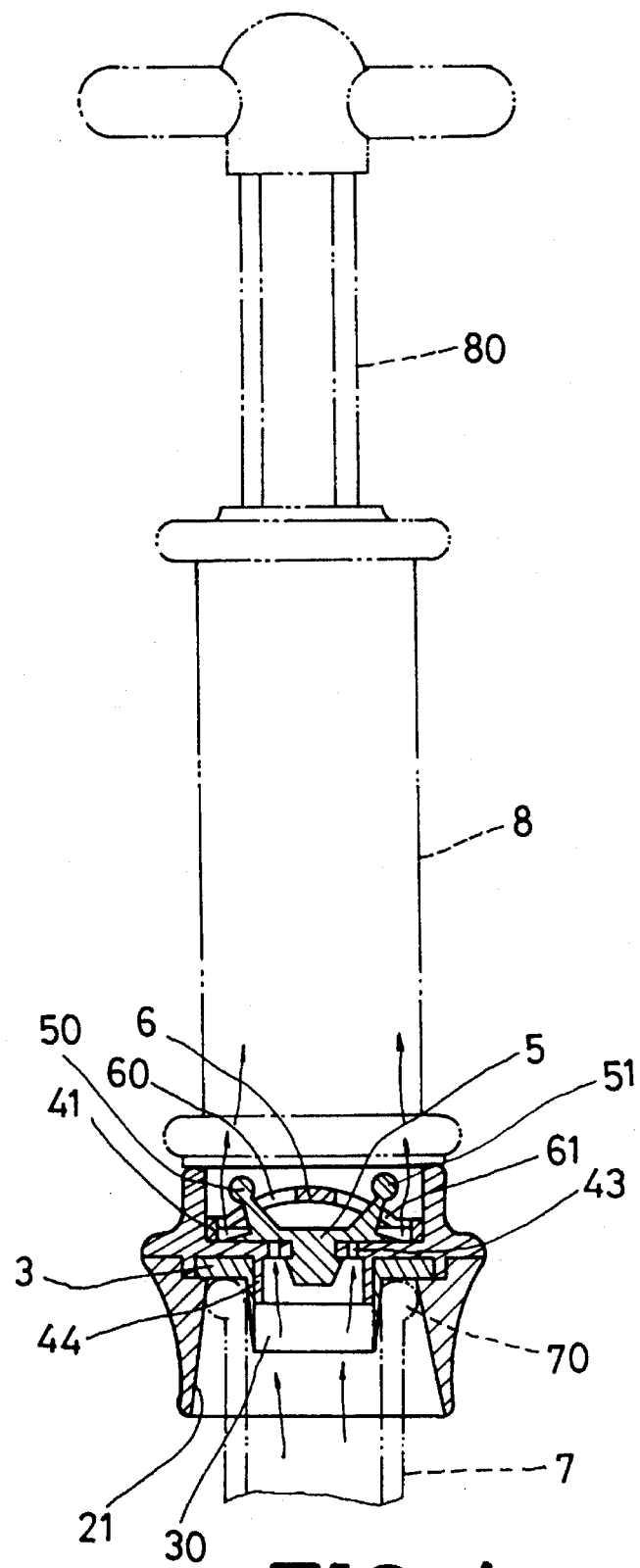
FIG. 4 is a cross-sectional view of the vacuum cap for liquor bottles in the present invention.

In using, as shown in FIG. 4, the cylinder body 2 is put around the top end 70 of a bottle 7, letting the tight gasket 3 and the annular edge 21 contact with the upper end 70 of the bottle 7. Then an air pump 8 is placed on the recess 41 of the lower cap body 4 for pumping out the air in the bottle 7 by pulling up and pushing down a pull cylinder 80. When the pull cylinder 80 is pulled up, the air in the bottle 7 is drawn through the central hole of the tight gasket 3, the annular wall 44, the air holes 43, the gap between the recess 41 and the air valve 5, and finally through the two slots 60, 61 of the upper cap body 6 and out in open air. When the air in bottle 7 is completely pumped out, establishing vacuum in the bottle, the tight gasket 3 is forced to contact closely with the top end 70 of the bottle 7, and the air valve 5 closely blocks the air holes 43, thus preventing outside air from flowing through this cap into the bottle 7. The content of the bottle 7 can be well preserved for a long period of time because of the vacuum condition of the bottle.

Figure 5:
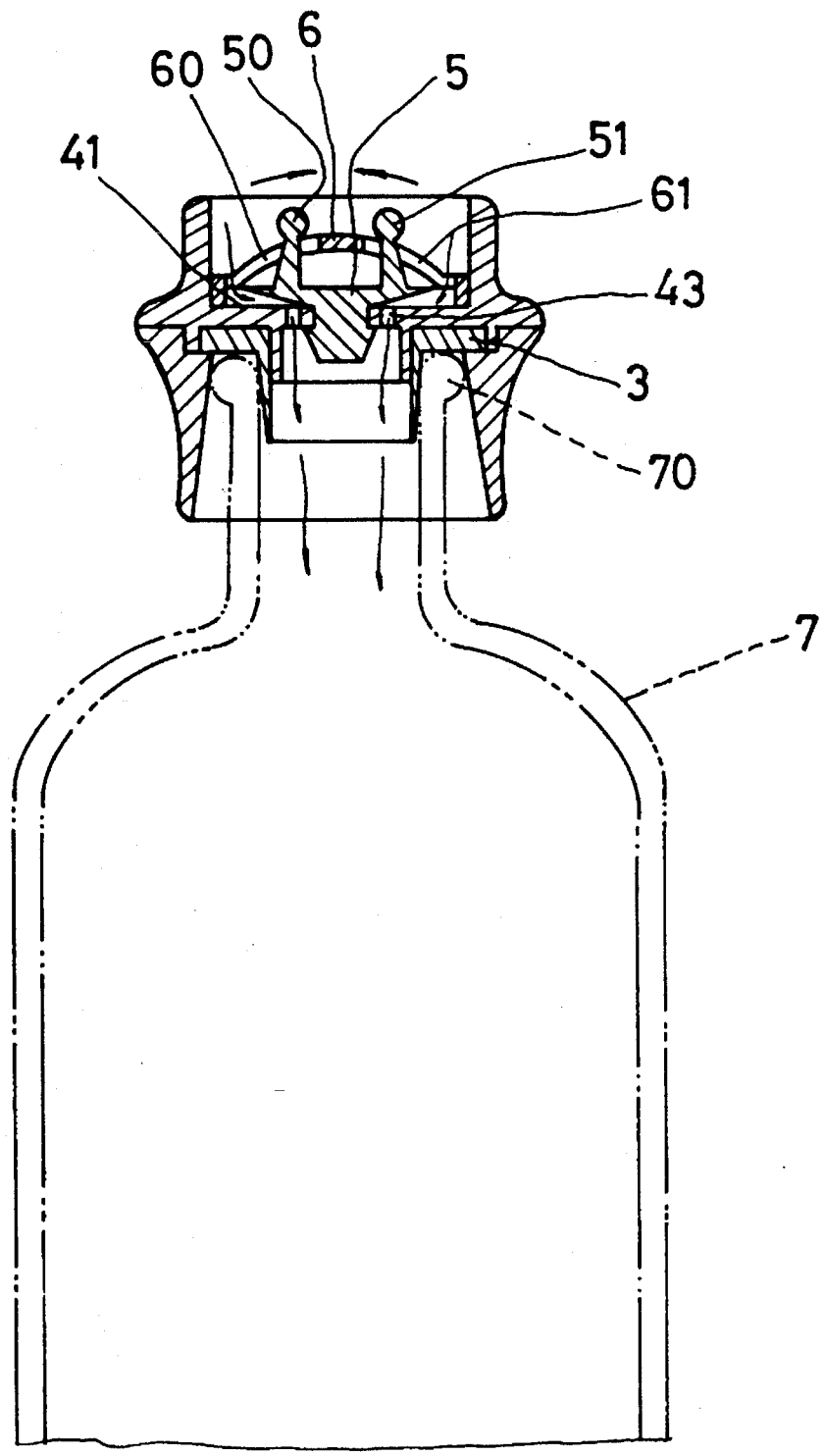
FIG. 5 is a cross-sectional view of the vacuum cap for liquor bottles in the present invention, showing the direction of open air flowing through the cap and into a bottle.

If the cylindrical body 2 is desired to be taken off the bottle 7, as shown in FIG. 5, either of the two projections 50, 51 of the air valve 5 protruding out of the slots 60, 61 of the upper cap body 6 is pulled to make a gap between the air valve 5 and the recess 41 of the lower cap body 4, thus letting outside air flow through the air holes 43 and into the bottle 7 until the air pressure in the bottle 7 becomes equal to that of the outside air. Then the tight gasket 3 becomes loosened from the bottle 7 and the cylindrical body 2 can be taken off.

What is claimed is:

1. A vacuum cap assembly for a liquor bottle comprising:

a) a hollow cylindrical body including an open top, an open bottom, an upper annular recess, and an annular wall diverging towards the open bottom;

b) a resilient T-shaped gasket engaged with the annular upper recess of the cylindrical body and including a central hole extending axially therethrough;

c) a lower cap body engageable on the open top of the cylindrical body and including a central upper recess, a central through hole, a plurality of air holes spaced around the central through hole, a downwardly and axially extending annular wall, and an outer annular edge surrounding the annular wall, the outer annular edge being engaged within the upper annular recess of the cylindrical body;

d) an air valve disposed in the central upper recess of the lower cap body and including a pair of upwardly and outwardly extending projections, a downwardly extending projection disposed through the central through hole of the lower cap body, and an annular stop groove engaged by a periphery of the central through hole; and e) an upper cap body disposed in the central upper recess of the lower cap body and over the air valve, the upper cap body including a pair of opposed slots, and the pair of projections of the air valve protruding through the opposed slots to permit air to flow therethrough.

2. The vacuum cap assembly of claim 1 further including an air pump engageable with the lower cap body for pumping air through the air holes of the lower cap body, past the air valve and central upper recess of the lower cap body and out the slots of the upper cap body for establishing a vacuum in a bottle to which the vacuum cap assembly is attached.

* * * * *